United States Patent
Guy et al.

(10) Patent No.: US 9,758,645 B2
(45) Date of Patent: Sep. 12, 2017

(54) USE OF A PRECIPITATED SILICA CONTAINING TITANIUM AND A SPECIFIC COUPLING AGENT IN AN ELASTOMER COMPOSITION

(71) Applicant: RHODIA OPERATIONS, Paris (FR)

(72) Inventors: Laurent Guy, Rillieux la Pape (FR); Dominique Dupuis, Crepy en Valois (FR); Emmanuelle Allain, L'hay les Roses (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/439,107

(22) PCT Filed: Oct. 29, 2013

(86) PCT No.: PCT/EP2013/072592
§ 371 (c)(1),
(2) Date: Apr. 28, 2015

(87) PCT Pub. No.: WO2014/067936
PCT Pub. Date: May 8, 2014

(65) Prior Publication Data
US 2015/0284546 A1    Oct. 8, 2015

(30) Foreign Application Priority Data
Oct. 29, 2012  (FR) .................................... 12 02901

(51) Int. Cl.
*C08L 7/00*    (2006.01)
*C08K 5/53*    (2006.01)

(52) U.S. Cl.
CPC ...... *C08L 7/00* (2013.01); *C08K 5/53* (2013.01); *C08L 2201/02* (2013.01)

(58) Field of Classification Search
CPC ........... C08F 8/40; C08L 7/00; C08L 2201/02
USPC ......................................... 525/209; 524/521
See application file for complete search history.

(56) References Cited

U.S. PATENT DOCUMENTS

| | | | |
|---|---|---|---|
| 4,170,609 A | 10/1979 | Turner | |
| 4,386,185 A * | 5/1983 | Macdonell | ........... C08K 5/5333 523/216 |
| 5,403,570 A | 4/1995 | Chevallier et al. | |
| 5,882,617 A | 3/1999 | Chevallier et al. | |
| 6,335,396 B1 | 1/2002 | Chevallier et al. | |
| 7,070,749 B2 | 7/2006 | Lindner et al. | |
| 2001/0039308 A1 * | 11/2001 | Custodero | ............. B60C 1/0016 524/430 |
| 2005/0267238 A1 | 12/2005 | Mutin | |
| 2012/0208975 A1 * | 8/2012 | Liu | ........................ C07F 9/302 526/278 |
| 2013/0178569 A1 * | 7/2013 | Guy | ......................... B60C 1/00 524/444 |

FOREIGN PATENT DOCUMENTS

| | | |
|---|---|---|
| EP | 0493263 A1 | 7/1992 |
| EP | 0520862 A1 | 12/1992 |
| WO | 95/09127 A1 | 4/1995 |
| WO | 95/09128 A1 | 4/1995 |
| WO | 2004016630 A1 | 2/2004 |
| WO | 2011050533 A1 | 5/2011 |
| WO | 2011050537 A1 | 5/2011 |
| WO | 2012009852 A1 | 1/2012 |
| WO | WO2012/146198 | * 11/2012 |

OTHER PUBLICATIONS

Brunauer, Stephen, et al—"Adsorption of Gases in Multimolecular Layers", 1938, Journal of American Chemical Society, vol. 60, pp. 309-319; 11 pages.

* cited by examiner

*Primary Examiner* — Deve E Valdez

(57) ABSTRACT

The invention concerns the combined use, in an elastomer composition preferably comprising an isoprene elastomer, a precipitated silica containing titanium and a specific conjugated diene compound, such as a conjugated diene phosphonate or phosphinate compound. It also concerns the elastomer compositions obtained and the items produced from said compositions.

20 Claims, No Drawings

USE OF A PRECIPITATED SILICA CONTAINING TITANIUM AND A SPECIFIC COUPLING AGENT IN AN ELASTOMER COMPOSITION

This application is a U.S. national phase entry under 35 U.S.C. §371 of International Application No. PCT/EP2013/072592, filed on Oct. 29, 2013, which claims priority to French Application No. 12 02901, filed on Oct. 29, 2012. The entire contents of these applications are explicitly incorporated herein by this reference.

The present invention relates to the combined use, in elastomer compositions, preferably comprising an isoprene elastomer, such as natural rubber, of a particular mineral filler and of a particular mineral filler/elastomer coupling agent.

The invention relates especially to the use of specific conjugated diene compounds, such as phosphonate or phosphinate conjugated diene compounds, in elastomer compositions comprising as reinforcing mineral filler a precipitated silica containing titanium.

The invention also relates to the corresponding elastomer compositions and to articles, especially tires, comprising such compositions.

It is known that articles made of elastomer(s) are generally subjected to various stresses, for instance a variation in temperature, a high frequency loading variation under dynamic conditions, a high static stress and/or appreciable flexural fatigue under dynamic conditions. Such articles are, for example, tires, footwear soles, floor coverings, conveyor belts, power transmission belts, flexible pipes, seals, in particular seals for domestic electrical appliances, supports which act to remove engine vibrations, either with metal frameworks or with a hydraulic fluid within the elastomer, cable sheathings, cables or rollers for cableways.

The proposal was then made to use in particular elastomer compositions reinforced with specific mineral fillers described as "reinforcing", preferably having high dispersibility. These fillers, in particular white fillers, such as precipitated silicas, are capable of rivalling or even exceeding, at least from the reinforcing viewpoint, the carbon black conventionally employed and in addition offer these compositions hysteresis that is generally lower, synonymous in particular with a decrease in the internal heating of the articles made of elastomer(s) during their use.

It is known to a person skilled in the art that it is generally necessary to employ, in elastomer compositions comprising such reinforcing fillers, a mineral filler/elastomer coupling agent, also known as bonding agent, the role of which is in particular to provide a sufficient connection, of chemical and/or physical nature, between the surface of the particles of mineral filler (for example a precipitated silica) and the elastomer(s), while at the same time facilitating the dispersion of this mineral filler within the elastomer matrix.

Such a coupling agent, which is at least bifunctional, has, for example, as simplified general formula, "N-V-M", in which:

N represents a functional group ("N" function) capable of bonding physically and/or chemically to the mineral filler, it being possible for such a bond to be established, for example, between a silicon atom of the coupling agent and the hydroxyl (OH) groups of the surface of the mineral filler (for example surface silanols, when silica is concerned);

M represents a functional group ("M" function) capable of bonding physically and/or chemically to the elastomer, in particular via an appropriate atom or a group of appropriate atoms (for example a sulfur atom);

V represents a group (divalent/hydrocarbon group) which makes it possible to connect "N" and "M".

The coupling agents must not be confused with simple covering agents for mineral fillers which, in a known manner, can comprise the "N" function that is active with regard to the mineral filler but are devoid of the "M" function that is active with regard to the elastomer.

Coupling agents, in particular silica/elastomer coupling agents, have been described in many documents of the state of the art, the most well-known being silane (poly)sulfides, in particular alkoxysilane (poly)sulfides. Mention may in particular be made, among these silane (poly)sulfides, of bis(triethoxysilylpropyl) tetrasulfide (abbreviated to TESPT), which is generally still regarded today as a product affording, for vulcanizates comprising a mineral filler as reinforcing filler, such as silica, a very good, indeed even the best, compromise in terms of safety toward scorching, of ease of use and of reinforcing power.

The combined use of precipitated silica, in particular highly dispersible silica, and of a silane (or functionalized organosilicon compound) polysulfide in a composition formed of modified elastomer(s) made possible the development of the "green tire" for passenger vehicles (light vehicles). This combination made it possible to achieve a wear resistance performance comparable to that of the mixtures of elastomers reinforced with carbon black, while at the same time significantly improving the rolling resistance (resulting in a decrease in fuel consumption) and the wet grip (thus reducing the braking distance on wet roads).

It would therefore be advantageous to be able to also use a mineral filler, such as silica, in tires for heavy-goods vehicles (such as lorries), which tires are obtained from compositions based on isoprene elastomer(s), mainly natural rubber.

However, the same silica/silane polysulfide combination, applied to an isoprene elastomer such as natural rubber, did not make it possible to obtain a satisfactory level of reinforcing (which may be illustrated by a stress/uniaxial tensile elongation curve) in comparison with the level that is obtained when carbon black is used as filler, this poorer reinforcing resulting in mediocre wear resistance.

One aim of the present invention is especially to propose a combination, for elastomer compositions comprising an elastomer, preferably an isoprene elastomer, such as natural rubber, of a particular coupling agent with a particular mineral filler (which is advantageously a reinforcing filler). This combination is an alternative to the use of known coupling agents with known reinforcing mineral fillers, and further gives said elastomer compositions a very satisfactory compromise of properties, especially as regards their rheological, mechanical and/or dynamic properties, especially the hysteresis properties. Generally, this combination allows an improvement in the hysteresis/reinforcement compromise. In addition, the elastomer compositions obtained preferably show very good adhesion, both to the mineral filler and to the substrates to which they are subsequently applied.

More precisely, the present invention provides elastomer compositions, preferably based on one or more isoprene elastomers, for example based on natural rubber, which are particularly suitable for the tires of heavy-goods vehicles, such as lorries. These elastomer compositions comprise a particular mineral filler and a specific compound which acts as a coupling agent between the mineral filler and the elastomer(s).

Thus, the invention relates, in its first subject, to the use, in an elastomer composition:
of a precipitated silica containing titanium, as (reinforcing) mineral filler, with
a compound having the formula (I) below, said compound of formula (I) being optionally, totally or partly, in a polymerized form:

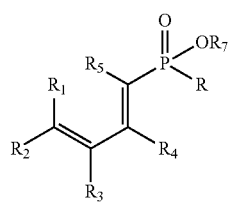

in which formula:
R represents $R_6$ or $OR_8$,
$R_1$, $R_2$, $R_3$, $R_4$, $R_5$ and $R_6$ are each independently chosen from hydrogen (H), alkyl, aryl, alkaryl, aralkyl, cycloalkyl, heterocycloalkyl and alkenyl groups, and
$R_7$ and $R_8$ are each independently chosen from hydrogen (H), alkyl, aryl, alkaryl, aralkyl, cycloalkyl and alkenyl groups, and metals chosen from the group consisting of Na, Li and Ca.

In general, the elastomer composition comprises at least one isoprene elastomer, preferably natural rubber.

The compound of formula (I) above, which is optionally, totally or partly, in a polymerized form, is generally used, inter alia, as a coupling agent between the mineral filler (precipitated silica containing titanium) and said elastomer(s) (generally between the mineral filler and the isoprene elastomer(s), and optionally between the mineral filler and other elastomers present in the composition).

According to a second subject, the invention relates to elastomer compositions using the specific combination described above, namely elastomer compositions comprising:
at least one elastomer, preferably an isoprene elastomer, in particular natural rubber,
at least one mineral filler,
at least one mineral filler/elastomer coupling agent,
characterized in that said mineral filler is a precipitated silica containing titanium and said coupling agent is the compound of formula (I) above, this compound of formula (I) being optionally, totally or partly, in a polymerized form.

The compound represented by formula (I) above is a conjugated diene compound. According to a specific embodiment, a mixture of different conjugated dienes corresponding to formula (I) may be used. One or more compounds of formula (I) may optionally be used together with another conjugated diene compound.

The compound(s) of formula (I) may be used, totally or partly, in a polymerized form. In the present specification, the term "compound of formula (I) in a polymerized form" refers to a polymer that may be obtained by polymerization of monomers comprising at least one monomer of formula (I) as defined above. This polymer may be a homopolymer or a copolymer (for example a block or random polymer).

In the specific case of a copolymer, it may be:
a polymer that may be obtained by polymerization of compounds of formula (I) of different nature (for example without any other monomer); or
a polymer that may be obtained by polymerization of one or more compounds of formula (I) with other monomers not corresponding to formula (I), said other monomers being chosen, for example, from:
conjugated diene compounds, for instance isoprene, butadiene and/or isobutylene;
unsaturated compounds, especially ethylenically, allylically and/or vinylically unsaturated compounds, which may be, for example, a vinylaromatic compound, a vinyl compound, a vinyl nitrile, an allylic compound, an allylic ester, an acrylic ester and/or a methacrylic ester.

Generally, a compound of formula (I) which is in a polymerized form is a polymer with a low polymerization index (known as an "oligomer"), for example a polymer with a polymerization index of less than 20 and preferably less than 10. The term "polymerization index" (or "degree of polymerization") of a given polymer population refers here to the mean number of monomer units contained in the polymers of the population under consideration. This "polymerization index" may especially be established using $^1$H NMR spectroscopy.

For example, a compound of formula (I) in a polymerized form may be:
a homopolymer of a monomer of formula (I), said homopolymer preferably having a polymerization index of less than 10 and even more preferably of less than 5; or
a copolymer formed by polymerization of a mixture consisting of different monomers each corresponding to formula (I), said polymer preferably having a polymerization index of less than 10 and even more preferably of less than 5.

The compounds of formula (I) used according to the present invention may be employed in the form:
of a single compound of formula (I);
of a homopolymer of a single compound of formula (I), optionally as a mixture with the same compound of formula (I) in a non-polymerized form;
of a mixture of two or more compounds of formula (I);
of a mixture of at least one compound of formula (I) in a non-polymerized form with at least one compound of formula (I) in a polymerized form, the compound(s) in the polymerized form being identical to or different from the compounds present in the non-polymerized form.

According to a specific embodiment of the present invention, the compounds that are useful as coupling agent, which are employed in the present invention, are or comprise at least one compound of formula (I) in a polymerized form, which is, for example, a polymer (oligomer) having the formula (II) below:

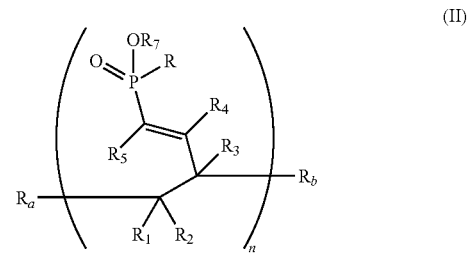

in which formula:
R, $R_1$, $R_2$, $R_3$, $R_4$, $R_5$ and $R_7$ are as defined previously;

n, which is the polymerization index of the polymer, is less than 20, in particular less than 10, especially between 1.2 and 7, for example between 1.5 and 6; and $R_a$ and $R_b$ are end groups, preferably chosen from H and alkyl groups.

In the polymer of formula (II), n may be, for example, between 2 and 5, especially between 2.5 and 4.5, for example between 3.8 and 4.

The compounds that are useful as coupling agent, which are employed according to the invention, may contain only one polymer of formula (II) or a mixture of different polymers corresponding to formula (II), optionally with one or more compounds of formula (I) in a non-polymerized form.

According to the present specification, the alkyl and alkenyl groups preferably comprise from 1 to 24 carbon atoms, especially from 1 to 18 carbon atoms, for example from 1 to 10 carbon atoms.

The aryl groups preferably comprise from 6 to 24 carbon atoms, especially from 6 to 18 carbon atoms, for example from 6 to 10 carbon atoms.

The alkaryl and aralkyl groups preferably comprise from 7 to 24 carbon atoms, especially from 7 to 18 carbon atoms, for example from 7 to 10 carbon atoms.

The cycloalkyl and heterocycloalkyl groups preferably comprise from 3 to 24 carbon atoms and especially from 3 to 18 carbon atoms.

According to a specific embodiment, two radicals from among $R_1$, $R_2$, $R_3$, $R_4$, $R_5$, $R_6$ and $R_7$ may together form a cycloalkyl or heterocycloalkyl group, preferably chosen from 3- to 8-membered rings.

The compounds of formula (I) or (II) may contain one or more chiral centers and/or one or more double bonds, and may consequently exist in the form of stereoisomers, such as Z and E isomers or cis and trans isomers of cyclic structures or of double bonds (for example geometrical isomers), rotamers, enantiomers or diastereoisomers. Thus, when the stereochemistry of the chiral centers is not specified, the chemical structures represented herein comprise all the possible configurations of these chiral centers, including the stereoisomerically pure form (for example geometrically pure, enantiomerically pure or diastereoisomerically pure) and enantiomeric and stereoisomeric mixtures, with the exception that when only one enantiomer is specified, the structure also comprises the other enantiomer. For example, when a compound of formula (I) described in the present invention is in Z form or in trans form for the double bond close to P, a person skilled in the art should understand that the E form or the cis form of the compound is also described. The enantiomeric and stereoisomeric mixtures may be resolved into their enantiomer or stereoisomer components by using separation techniques or chiral synthesis techniques that are well known to those skilled in the art.

According to one embodiment of the present invention, in formula (I) or (II) as defined previously, $R_1$ represents H (hydrogen group).

According to one embodiment of the present invention, in formula (I) or (II) as defined previously, $R_2$ represents H. According to a specific embodiment, $R_1$ and $R_2$ both represent H.

According to one embodiment of the present invention, in formula (I) or (II) as defined previously, $R_4$ represents H. In this case especially, $R_1$ and/or $R_2$ may represent H.

According to one embodiment of the present invention, in formula (I) or (II) as defined previously, $R_1$, $R_2$ and $R_4$ represent H.

In formula (I) or (II) as defined previously, $R_3$ may represent an alkyl group, for example a methyl group.

In formula (I) or (II) as defined previously, $R_5$ may represent an alkyl group, for example a methyl group.

According to a particular embodiment, in formula (I) or (II), $R_3$ and $R_5$ both represent a methyl group.

According to a particular embodiment, in formula (I) or (II), $R_1$, $R_2$ and $R_4$ represent a hydrogen atom (H), and $R_3$ and $R_5$ represent a methyl group.

According to a first variant of the invention, R is a group $R_6$. According to this variant, $R=R_6$ preferably represents H. In this case, which is preferred according to the invention, the compounds of formula (I) or (II) bear phosphinate groups.

According to this first variant, the compounds that are useful as coupling agent, which are used according to the invention, may especially comprise compounds having the formula III, this compound being optionally, totally or partly, in a polymerized form:

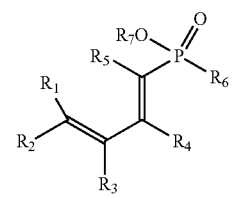

III in which formula $R_1$, $R_2$, $R_3$, $R_4$, $R_5$ and $R_6$ represent, independently of each other, a hydrogen, alkyl, aryl, alkaryl, aralkyl, cycloalkyl, heterocycloalkyl or alkenyl group; preferably, said alkyl and said alkenyl comprise from 1 to 18 carbon atoms, said aryl comprises from 6 to 18 carbon atoms, said alkaryl and said aralkyl comprise from 7 to 18 carbon atoms, and said cycloalkyl and said heterocycloalkyl comprise from 3 to 18 carbon atoms.

Preferably, $R_1$ and/or $R_2$ represent hydrogen (H).

Preferably, $R_1$, $R_2$ and $R_4$ represent hydrogen; or $R_3$ and $R_5$ represent a methyl group; even more preferably, $R_1$, $R_2$ and $R_4$ represent hydrogen, $R_3$ and $R_5$ represent a methyl group.

$R_7$ represents a hydrogen, alkyl, aryl, alkaryl, aralkyl, cycloalkyl or alkenyl group, or a metal chosen from the group consisting of Na, Li and Ca; preferably, said alkyl and said alkenyl comprise from 1 to 18 carbon atoms, said aryl comprises from 6 to 18 carbon atoms, said alkaryl and said aralkyl comprise from 7 to 18 carbon atoms, and said cycloalkyl and said heterocycloalkyl comprise from 3 to 18 carbon atoms.

According to a particular embodiment, any two radicals from among $R_1$, $R_2$, $R_3$, $R_4$, $R_5$, $R_6$ and $R_7$ together form a cycloalkyl or heterocycloalkyl group, which is preferably chosen from 3- to 8-membered rings.

A specific phosphinate compound of formula (III) that is useful according to the present invention is 4-methyl-2,4-pentadiene-2-phosphinic acid (PiDM) having the following formula:

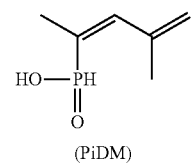

(PiDM)

The compounds of formula (III) above (for example PiDM) may especially be prepared from α,β- or β,γ-unsaturated ketones or aldehydes, for example via a process comprising:

the reaction of an α,β- or β,γ-unsaturated ketone or aldehyde of formula (I-1) or (II-1),

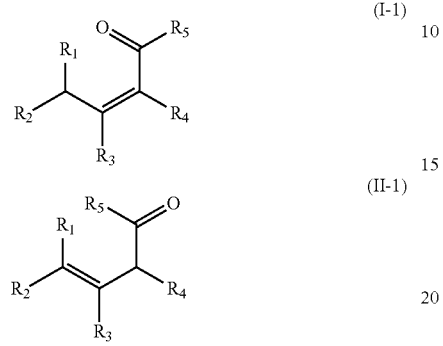

with a phosphinic acid or derivatives thereof of formula

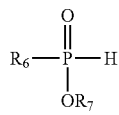

to obtain a compound of formula (III) as defined previously.

The above process makes it possible to change the selectivity of the reaction of phosphinate compounds bearing at least one P—H bond to selectively obtain 1,3-diene compounds starting with α,β- or β,γ-unsaturated carbonyl compounds.

Without wishing to be bound to any existing theory, the above preparation process is valid starting with α,β-unsaturated carbonyl compounds or β,γ-unsaturated carbonyl compounds, and the two species lead to the formation of the same diene.

According to this process, compound (I-1) or (II-1) is preferably added in a mole ratio of from 0.5:1 to 2:1 relative to said phosphinic acid or derivatives thereof; or preferably from 1:1 to 1.5:1 relative to said phosphinic acid or derivatives thereof. The reaction is generally performed in an organic solvent such as one or more solvents chosen from the group consisting of toluene, cyclohexane and butyl ether. The reaction time is generally from 4 to 24 hours, for example from 4 to 8 hours. The reaction temperature is usually from 0 to 150° C. and preferably from 85 to 125° C.

The reaction is preferably performed under the protection of an inert gas. Said inert gas may be chosen, for example, from one or more gases from the group consisting of nitrogen, argon and carbon dioxide.

For example, mesityl oxide is reacted with hypophosphorous acid in concentrated form to obtain 4-methyl-2,4-pentadiene-2-phosphinic acid. The same reaction may be performed using 50% hypophosphorous acid and using toluene as azeotropic solvent to remove the water during the reaction. The target monomer may be readily isolated and purified by simple extractions and washes to obtain a product that is up to 97% pure.

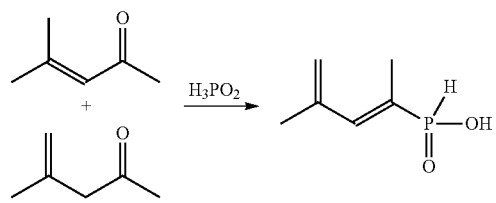

The process described above allows the formation of a mixture of phosphinate and phosphonate compounds that may be directly polymerized to obtain polymers containing both phosphinate and phosphonate groups in which the two functionalities are well known for providing useful properties.

The unsaturated ketones and aldehydes that are suitable for the present invention may be obtained from aldol condensations of ketones and aldehydes.

For example, mention may be made of the dimerization of methyl isobutyl ketone (MIBK) as taught in U.S. Pat. No. 4,170,609.

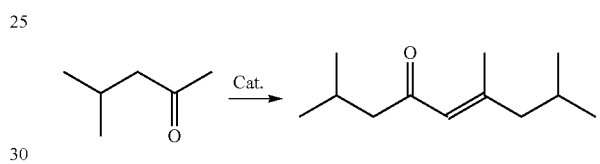

Similarly, the aldol condensation of pinacol gives a highly branched unsaturated ketone:

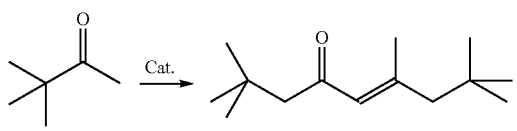

Commercially available unsaturated ketones and aldehydes may also be used. These are important industrial chemical products used as solvents, for example mesityl oxide, which is a precursor of other base products and specialty chemical products, for example isophorone, and a monomer for polymer materials, for example methyl vinyl ketone (MVK).

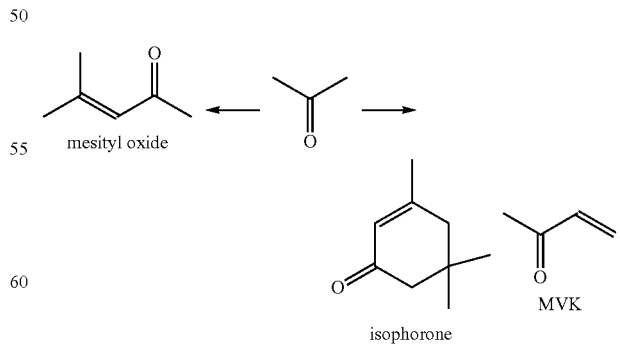

3-Methylcrotonaldehyde is a precursor of vitamin A. Industrially, it is produced from isobutene and formaldehyde:

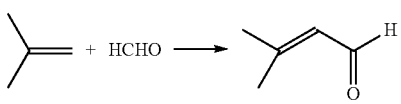

An interesting compound is crotonaldehyde. This is a biogenic compound, used for aromatization. It may be produced from renewable resources, bioethanol:

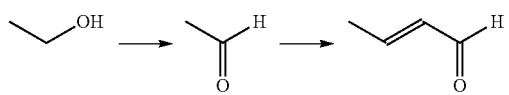

2-Ethylacrolein and its isomer tiglic aldehyde are intermediates for aromatizing agents (U.S. Pat. No. 4,605,779):

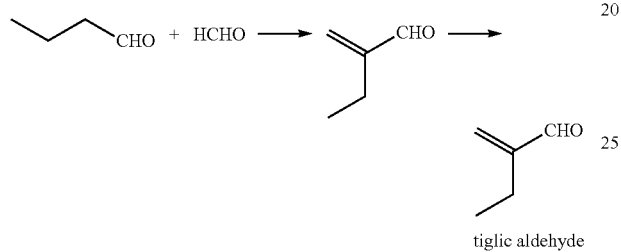

tiglic aldehyde

Natural unsaturated ketones and aldehydes may also be used in the preparation, for example piperitone, carvone, umbellulone, menthene-2-one, menthene-3-one, verbenone and myrtenal.

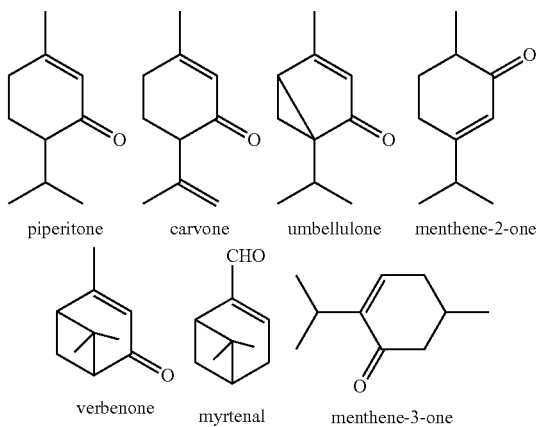

piperitone    carvone    umbellulone    menthene-2-one
verbenone    myrtenal    menthene-3-one According to a second variant of the invention, R is a group $OR_8$. According to this variant, $R_8$ preferably represents H. For example, $R_7$ and $R_8$ represent H. According to another embodiment, $R_7$ and $R_8$ may together form a cycloalkyl or heterocycloalkyl group, which is preferably chosen from 5-, 6-, 7- and 8-membered rings. In this case, the compounds of formula (I) or (II) bear phosphonate groups.

According to this second variant, the compounds that are useful as coupling agent, which are used according to the invention, may especially comprise compounds of formula (I) as defined previously, totally or partly, in a polymerized form, and in which:

$R_1$, $R_2$, $R_3$, $R_4$ and $R_5$ represent, independently of each other, a hydrogen, alkyl, aryl, alkaryl, aralkyl, cycloalkyl, heterocycloalkyl or alkenyl group; preferably, said alkyl and said alkenyl comprise from 1 to 24 carbon atoms, said aryl comprises from 6 to 24 carbon atoms, said alkaryl and said aralkyl comprise from 7 to 24 carbon atoms, and said cycloalkyl and said heterocycloalkyl comprise from 3 to 24 carbon atoms; even more preferably, said alkyl and said alkenyl comprise from 1 to 18 carbon atoms, said aryl comprises from 6 to 18 carbon atoms, said alkaryl and said aralkyl comprise from 7 to 18 carbon atoms, and said cycloalkyl and said heterocycloalkyl comprise from 3 to 18 carbon atoms. Preferably, according to this embodiment, $R_1$ and/or $R_2$ represent hydrogen (H). $R_1$, $R_2$ and $R_4$ may especially represent hydrogen; or, preferably, $R_3$ and $R_5$ represent a methyl group. Even more preferably, $R_1$, $R_2$ and $R_4$ represent hydrogen, and $R_3$ and $R_5$ represent a methyl group. Any two radicals from among $R_1$, $R_2$, $R_3$, $R_4$ and $R_5$ may together form a cycloalkyl or heterocycloalkyl group, which is preferably chosen from 5-, 6-, 7- and 8-membered rings.

R represents $OR_8$, and $R_7$ and $R_8$ represent, independently of each other, a hydrogen (H), alkyl, aryl, alkaryl, aralkyl, cycloalkyl, or alkenyl group, or a metal chosen from the group consisting of Na, Li and Ca; preferably, said alkyl and said alkenyl comprise from 1 to 24 carbon atoms, said aryl comprises from 6 to 24 carbon atoms, said alkaryl and said aralkyl comprise from 7 to 24 carbon atoms, and said cycloalkyl and said heterocycloalkyl comprise from 3 to 24 carbon atoms; even more preferably, said alkyl and said alkenyl comprise from 1 to 18 carbon atoms, said aryl comprises from 6 to 18 carbon atoms, said alkaryl and said aralkyl comprise from 7 to 18 carbon atoms, and said cycloalkyl and said heterocycloalkyl comprise from 3 to 18 carbon atoms. Preferably, according to this specific embodiment, $R_7$ and $R_8$ represent hydrogen. According to another embodiment, $R_7$ and $R_8$ together form a cycloalkyl or heterocycloalkyl group, which is preferably chosen from 5-, 6-, 7- and 8-membered rings.

A specific phosphonate compound according to this variant is 4-methyl-2,4-pentadiene-2-phosphonic acid (PoDM) having the following formula:

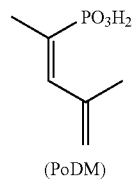

(PoDM)

Other interesting compounds are PoDM homopolymers, especially those corresponding to the following formula:

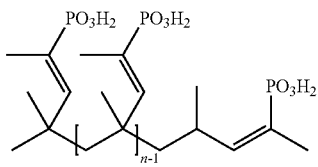

in which n is generally less than 19, preferably less than 9, in particular between 0.2 and 6, especially between 0.5 and 5 (for example between 1 and 4 or between 1.5 and 3.5, or equal to 2.9).

The phosphonate compounds according to the second variant may be prepared, for example, from α,β- or β,γ-unsaturated ketones or aldehydes, via a process which comprises the reaction of an α,β- or β,γ-unsaturated ketone or aldehyde of formula (I-1) or (II-1) as defined previously, with a phosphorous acid or derivatives thereof having the structure $R_7$ and $R_8$ being as defined previously in formula (I).

According to the above process, compound (I-1) or (II-1) is preferably added in a mole ratio of from 1:1 to 1.5:1 and preferably from 1:1 to 1.2:1 relative to said phosphorous acid or derivatives thereof. The reaction time is generally from 4 to 24 hours and preferably from 4 to 8 hours. The reaction temperature is usually from 0 to 100° C. and preferably from 20 to 60° C.

The above reaction may preferably be performed under the protection of an inert gas. Said inert gas may be chosen, for example, from one or more gases from the group consisting of nitrogen, argon and carbon dioxide.

Without wishing to be bound to any existing theory, the above preparation process of the present invention is valid starting with α,β-unsaturated carbonyl compounds or α,γ-unsaturated carbonyl compounds, and the two species lead to the formation of the same diene.

The unsaturated ketones and aldehydes used in the process may be obtained from aldol condensations of carbonyl compounds.

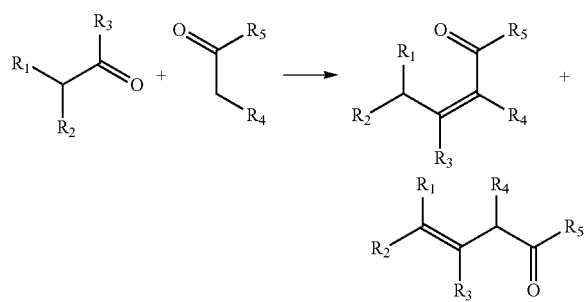

The mineral filler that is used in the present invention is a precipitated silica containing titanium.

In general, the precipitated silica used in the context of the invention has a titanium content of at least 0.5% by weight, preferably of at least 0.75% by weight and in particular of at least 1.0% by weight.

This content may optionally be at least 1.5% by weight, in particular at least 2.0% by weight, especially at least 2.5% by weight, for example at least 3.0% by weight, or even at least 3.5% by weight.

Preferably, the precipitated silica used as reinforcing filler according to the invention has a titanium content of not more than 10% by weight, in particular not more than 5% by weight, especially not more than 4.0% by weight, for example not more than 3.7% by weight.

According to one embodiment of the invention, the titanium content of the precipitated silica used is between 0.5% and 10% by weight, preferably between 0.5% and 5.0% by weight, in particular between 0.75% and 5.0% by weight, for example between 1.0% and 4.0% by weight. This content may especially be between 2.0% and 4.0% by weight.

The titanium content may be measured via any suitable process, for example by ICP-OES (Inductively Coupled Plasma-Optical Emission Spectroscopy), for example using a machine such as the Horiba Jobin Yvon Ultima machine, especially after dissolution with hydrofluoric acid.

The principle of the method of measurement by ICP-OES is as follows:

silica is dissolved with hydrofluoric acid: for example, addition of 4 mL of concentrated hydrofluoric acid (40% by mass) to 200 mg of precipitated silica, followed by addition to 30 mL of ultrapure water; two dilutions are then performed, one a hundred-fold dilution and the other a thousand-fold dilution, in water acidified with 5% nitric acid; this step lasts about 1 hour;

each solution obtained above is then introduced into the plasma of the ICP-OES, which provides the energy to excite the titanium; the wavelengths 323.452 nm, 323.904 nm, 336.121 nm and 338.376 nm correspond to the emission lines of titanium and their intensity depends on the titanium content; a calibration is performed beforehand (for example from 0.1 to 1 mg/L) using a standard solution at 1 g/L; this step lasts about 2 hours.

The titanium may be in the form of $TiO_2$ at the surface of the silica.

Part of the titanium may also be inserted into the silica network (in general with bonds of the Ti—O—Si type).

Preferably, the majority of the titanium is inserted into the silica network. All of the titanium may be inserted into the silica network. The absence of crystalline $TiO_2$ at the surface of the silica may then be illustrated by XRD (X-ray diffraction).

According to a specific embodiment, the precipitated silica used according to the invention is highly dispersible. Thus, it especially has great capacity for disintegration and dispersion in a polymer matrix, which may be observed by electron microscopy or optical microscopy, on thin slices.

Generally, the precipitated silica used in the present invention has a CTAB specific surface area of between 70 and 300 $m^2/g$.

This CTAB specific surface area may be between 70 and 100 $m^2/g$, for example between 75 and 95 $m^2/g$.

Very preferably, however, the CTAB specific surface area of said precipitated silica is between 100 and 300 $m^2/g$, in particular between 100 and 240 $m^2/g$, especially between 130 and 230 $m^2/g$, for example between 140 and 200 $m^2/g$.

Generally, the precipitated silica used in the present invention has a BET specific surface area of between 70 and 300 $m^2/g$.

This BET specific surface area may be between 70 and 100 $m^2/g$, for example between 75 and 95 $m^2/g$.

Very preferably, however, the BET specific surface area of said precipitated silica is between 100 and 300 $m^2/g$, in particular between 100 and 240 $m^2/g$, especially between 130 and 230 $m^2/g$, for example between 140 and 200 $m^2/g$.

The CTAB specific surface area is the external surface, which may be determined according to standard NF ISO 5794-1, Appendix G (June 2010). The BET specific surface area may be determined according to the Brunauer-Emmett-Teller method described in the *Journal of the American Chemical Society*, vol. 60, page 309, February 1938, and corresponding to standard NF ISO 5794-1, Appendix D (June 2010).

The precipitated silica containing titanium used in the invention may, for example, have:

a CTAB specific surface area from 140 to 170 m²/g and a BET specific surface area from 140 to 180 m²/g, or a CTAB specific surface area from 70 to 140 m²/g, especially from 70 to 100 m²/g, and a BET specific surface area from 70 to 140 m²/g, especially from 70 to 100 m²/g, or a CTAB specific surface area from 170 to 300 m²/g, especially from 180 to 220 m²/g, and a BET specific surface area from 180 to 300 m²/g, especially from 185 to 230 m²/g.

The precipitated silica used in the context of the invention may have a BET specific surface area/CTAB specific surface area ratio of greater than 1.1 and in particular greater than 1.2.

One of the parameters of the precipitated silica containing titanium used in the invention may lie in the distribution of its pore volume and in particular in the distribution of the pore volume which is generated by the pores with diameters of less than or equal to 400 Å. The latter volume corresponds to the useful pore volume of the fillers employed in the reinforcement of elastomers.

While this precipitated silica may have, according to one variant, a pore distribution such that the pore volume generated by the pores with a diameter of between 175 and 275 Å (V2) represents less than 50% of the pore volume generated by the pores with diameters of less than or equal to 400 Å (V1), it may be advantageous to use, according to a second variant, a precipitated silica having a pore distribution such that the pore volume generated by the pores with a diameter of between 175 and 275 Å (V2) represents at least 50%, for example at least 55%, of the pore volume generated by the pores with diameters of less than or equal to 400 Å (V1).

The pore volumes and pore diameters are measured by mercury (Hg) porosimetry using a Micromeritics Autopore 9520 porosimeter and are calculated via the Washburn relationship with a contact angle theta equal to 130° and a gamma surface tension equal to 484 dynes/cm (standard DIN 66133).

The ability of the silicas to disperse and to deagglomerate may be quantified by means of the specific deagglomeration test below.

A particle size measurement is performed (by laser diffraction) on a suspension of silica deagglomerated beforehand by ultrasonication; the ability of the silica to deagglomerate (cleavage of objects from 0.1 to several tens of microns) is thus measured. The ultrasound deagglomeration is performed using a Vibracell Bioblock (600 W) sonicator equipped with a probe 19 mm in diameter. The particle size measurement is performed by laser diffraction on a Sympatec Helios/BF particle sizer (equipped with an optical lens of R3 (0.9-175 μm) type), employing the Fraunhofer theory.

2 grams (±0.1 gram) of silica are introduced into a 50 ml beaker (height: 7.5 cm and diameter: 4.5 cm) and the weight is made up to 50 grams by addition of 48 grams (±0.1 gram) of deionized water. A 4% aqueous silica suspension is thus obtained.

The ultrasound deagglomeration is subsequently performed as follows: the "TIMER" button of the sonicator is pressed and the time is adjusted to 5 minutes 30 seconds. The amplitude of the probe (corresponding to the nominal power) is adjusted to 80% and then the ultrasound probe is immersed over 5 centimeters in the silica suspension present in the beaker. The ultrasound probe is then switched on and deagglomeration is performed for 5 minutes 30 seconds at 80% amplitude of the probe.

The particle size measurement is subsequently performed by introducing, into the vessel of the particle sizer, a volume V (expressed in ml) of the suspension, this volume V being such that 8% optical density is achieved on the particle sizer.

The median diameter $\varnothing_{50}$, after ultrasound deagglomeration, is such that 50% by number of the particles have a size less than $\varnothing_{50}$ and 50% have a size greater than $\varnothing_{50}$. The value of the median diameter $\varnothing_{50}$ which is obtained decreases in proportion as the ability of the silica to deagglomerate increases.

It is also possible to determine the ratio (10×V/optical density of the suspension detected by the particle sizer), this optical density corresponding to the true value detected by the particle sizer during the introduction of the silica.

This ratio (deagglomeration factor $F_D$) is indicative of the content of particles less than 0.1 μm in size that are not detected by the particle sizer. This ratio increases in proportion as the ability of the silica to deagglomerate increases.

The precipitated silica used according to the invention may have a diameter $\varnothing_{50}$, after ultrasound deagglomeration, of not more than 5.5 μm and preferably less than 4 μm.

It may have an ultrasound deagglomeration factor $F_D$ of greater than 4.5 ml and in particular greater than 5.5 ml.

Moreover, the pH of the precipitated silica used in the present invention is generally between 6.0 and 8.2, for example between 6.2 and 8.0.

The pH is measured according to the following method deriving from standard ISO 787/9 (pH of a 5% suspension in water):

Apparatus:
calibrated pH meter (reading accurate to $\frac{1}{100}^{th}$)
combined glass electrode
200 ml beaker
100 ml measuring cylinder
balance accurate to within 0.01 g.

Procedure:
5 grams of silica are weighed to within 0.01 gram into the 200 ml beaker. 95 ml of water, measured from the graduated measuring cylinder, are subsequently added to the silica powder. The suspension thus obtained is vigorously stirred (magnetic stirring) for 10 minutes. The pH measurement is then performed.

The precipitated silica used according to the invention may be in any physical state, i.e. it may be in the form of substantially spherical beads (microbeads), a powder or granules.

It may thus be in the form of substantially spherical beads with a mean size of at least 80 μm, preferably of at least 150 μm, in particular between 150 and 270 μm; this mean size may be determined according to standard NF X 11507 (December 1970) by dry screening and determination of the diameter corresponding to a cumulative oversize of 50%.

It may also be in the form of a powder with a mean size of at least 3 μm, in particular of at least 10 μm and preferably of at least 15 μm; this size is, for example, between 15 and 60 μm.

It may be in the form of granules (generally of substantially parallelepipedal shape) at least 1 mm in size, for example between 1 and 10 mm, especially along the axis of their greatest dimension.

The precipitated silica as defined previously may be prepared, for example, via a precipitation reaction of a silicate, in particular of an alkali metal silicate (such as sodium silicate) with an acidifying agent (such as sulfuric acid). A suspension of precipitated silica is thus obtained, and the precipitated silica obtained is then separated out, in particular by filtration, with the production of a filter cake, this cake then generally being subjected to a liquefaction step, this step comprising the addition of an aluminum compound (in particular sodium aluminate). Next, there is a drying step, generally by atomization. The process for preparing the precipitated silica may be any process, such as the addition of an acidifying agent to a silicate reaction mixture or the total or partial simultaneous addition of the acidifying agent and of the silicate to a reaction mixture comprising water and a silicate. The titanium is introduced during the preparation of the precipitated silica, according to any suitable method.

The precipitated silica used in the invention may optionally be prepared, for example, by application of processes such as those described in patents EP0493263 and U.S. Pat. No. 7,070,749.

The precipitated silica used in the invention may be prepared, for example, by applying the processes described in patents EP0670813 and EP0670814 or, preferably, EP0520862, in which a step of introducing the titanium is added.

In particular, in the context of the process described in patent EP0520862, the titanium may thus be added especially by introducing a solution of titanium oxysulfate ($TiOSO_4$), in the liquefaction step, generally while correcting the pH by adding a basic agent (for example sodium hydroxide); the titanium may also be added especially by introducing a dilute solution of titanium oxysulfate ($TiOSO_4$), during the precipitation of the silica, during the simultaneous addition, especially at a pH of at least 8, of the acidifying agent and of the silicate; the titanium may also be added, especially by introducing a solution of titanium oxysulfate (preferably simultaneously with a basic agent), to a silica slurry obtained by liquefying the filter cake, a basic agent then preferably being added (for example so as to reach a pH of at least 8), the silica slurry finally obtained then being subjected to filtration, the filter cake obtained then being subjected to a liquefaction step, and a drying step then takes place.

A precipitated silica may optionally be impregnated with a solution of titanium oxysulfate ($TiOSO_4$), but this is not the preferred route.

The precipitated silica containing titanium and the conjugated diene compound of formula (I) may be mixed together before their use in the elastomer composition. According to a first embodiment, the conjugated diene compound of formula (I) is not grafted onto said precipitated silica. According to a second embodiment, the conjugated diene compound of formula (I) is grafted onto said precipitated silica; this silica may thus the in "precoupled" form before it is mixed with the elastomer composition.

They may be introduced separately into the elastomer composition.

The elastomer compositions in which the conjugated diene compound of formula (I) and the precipitated silica containing titanium are used may contain at least one agent for covering this precipitated silica.

Moreover, the elastomer compositions in which the conjugated diene compound of formula (I) and the precipitated silica containing titanium are used may optionally comprise at least one other mineral filler/elastomer coupling agent, in particular a silane sulfide or polysulfide, for instance:
bis(triethoxysilylpropyl) disulfide (TESPD)
bis(triethoxysilylpropyl) tetrasulfide (TESPT)
bis(monohydroxydimethylsilylpropyl) tetrasulfide
bis(monoethoxydimethylsilylpropyl) disulfide (MESPD)
bis(monoethoxydimethylsilylpropyl) tetrasulfide(MESPT)
bis(monoethoxydimethylsilylisopropyl) tetrasulfide(MESiPrT).

However, preferably, said elastomer compositions do not contain any mineral filler/elastomer coupling agent in addition to the conjugated diene compound of formula (I).

Advantageously, the elastomer composition used in the present invention comprises at least one isoprene elastomer, preferably natural rubber.

According to one embodiment, such an elastomer composition may preferably not comprise any elastomers other than the isoprene elastomer(s).

According to another embodiment, such an elastomer composition may comprise, in addition to the isoprene elastomer(s), at least one elastomer other than the isoprene elastomer(s). In particular, the elastomer composition may comprise at least one isoprene elastomer (for example natural rubber) and at least one diene elastomer other than an isoprene elastomer, the amount of isoprene elastomer(s) relative to the total amount of elastomer(s) then preferably being greater than 50% by weight (generally less than 99.5% by weight, for example between 70% and 99% by weight).

The isoprene elastomers that may be used in the elastomer compositions according to the invention are more specifically chosen from:

(1) synthetic polyisoprenes obtained by homopolymerization of isoprene or 2-methyl-1,3-butadiene;

(2) synthetic polyisoprenes obtained by copolymerization of isoprene with one or more ethylenically unsaturated monomers chosen from:
  (2.1) conjugated diene monomers, other than isoprene, containing from 4 to 22 carbon atoms, for instance 1,3-butadiene, 2,3-dimethyl-1,3-butadiene, 2-chloro-1, 3-butadiene (or chloroprene), 1-phenyl-1,3-butadiene, 1,3-pentadiene or 2,4-hexadiene;
  (2.2) vinylaromatic monomers containing from 8 to 20 carbon atoms, for instance styrene, ortho-, meta- or para-methylstyrene, the commercial mixture "vinyltoluene", para-(tert-butyl)styrene, methoxystyrenes, chlorostyrenes, vinylmesitylene, divinylbenzene or vinylnaphthalene;
  (2.3) vinyl nitrile monomers containing from 3 to 12 carbon atoms, for instance acrylonitrile or methacrylonitrile;
  (2.4) acrylic ester monomers derived from acrylic acid or methacrylic acid with alkanols containing from 1 to 12 carbon atoms, for instance methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;
  (2.5) a mixture of at least two of the abovementioned monomers (2.1) to (2.4); copolymeric polyisoprenes comprising between 20% and 99% by weight of isoprene units and between 80% and 1% by weight of diene, vinylaromatic, vinyl nitrile and/or acrylic ester units, and consisting, for example, of poly(isoprene-butadiene), poly(isoprene-styrene) and poly(isoprene-butadiene-styrene);

(3) natural rubber;

(4) copolymers obtained by copolymerization of isobutene and isoprene (butyl rubber), and also the halogenated versions, in particular chlorinated or brominated versions, of these copolymers;

(5) a mixture of at least two of the abovementioned elastomers (1) to (4);

(6) a mixture comprising more than 50% by weight (preferably less than 99.5% by weight and for example from 70% to 99% by weight) of abovementioned elastomer (1) or (3) and less than 50% by weight (preferably more than 0.5% by weight, for example between 1% and 30% by weight) of one or more diene elastomers other than isoprene elastomers.

The term "diene elastomer other than an isoprene elastomer" means, in a manner known per se, in particular: homopolymers obtained by polymerization of one of the conjugated diene monomers defined above in point (2.1), for instance polybutadiene and polychloroprene; copolymers obtained by copolymerization of at least two of the abovementioned conjugated dienes (2.1) with each other or by copolymerization of one or more of the abovementioned conjugated dienes (2.1) with one or more abovementioned unsaturated monomers (2.2), (2.3) and/or (2.4), for instance poly(butadiene-styrene) and poly(butadiene-acrylonitrile); ternary copolymers obtained by copolymerization of ethylene and an α-olefin containing from 3 to 6 carbon atoms with a non-conjugated diene monomer containing from 6 to 12 carbon atoms, for instance the elastomers obtained from ethylene or propylene with a non-conjugated diene monomer of the abovementioned type, especially such as 1,4-hexadiene, ethylidenenorbornene or dicyclopentadiene (EPDM elastomer).

Preferentially, the elastomer composition comprises one or more isoprene elastomers chosen from:

(1) homopolymeric synthetic polyisoprenes;
(2) copolymeric synthetic polyisoprenes consisting of poly(isoprene-butadiene), poly(isoprene-styrene) and poly(isoprene-butadiene-styrene);
(3) natural rubber;
(4) butyl rubber;
(5) a mixture of at least two of the abovementioned elastomers (1) to (4);
(6) a mixture comprising more than 50% by weight (preferably less than 99.5% by weight, for example from 70% to 99% by weight) of abovementioned elastomer (1) or (3) and less than 50% by weight (preferably more than 0.5% by weight, for example between 1% and 30% by weight) of diene elastomer other than an isoprene elastomer consisting of polybutadiene, polychloroprene, poly(butadiene-styrene), poly(butadiene-acrylonitrile) or an (ethylene-propylene-non-conjugated diene monomer) terpolymer.

More preferentially, the elastomer composition comprises one or more isoprene elastomers chosen from: (1) homopolymeric synthetic polyisoprenes; (3) natural rubber; (5) a mixture of the abovementioned elastomers (1) and (3); (6) a mixture comprising more than 50% by weight (preferably less than 99.5% by weight, for example from 70% to 99% by weight) of abovementioned elastomer (1) and (3) and less than 50% by weight (preferably more than 0.5% by weight, for example between 1% and 30% by weight) of diene elastomer other than an isoprene elastomer consisting of polybutadiene and poly(butadiene-acrylonitrile).

According to a highly preferred alternative form of the invention, the elastomer composition comprises, as isoprene elastomer, at least natural rubber, indeed even solely natural rubber.

According to a very preferred variant of the invention, the elastomer composition comprises, as elastomer(s), only a natural rubber.

In general, the elastomer composition used according to the invention may also comprise all or some of the other constituents and auxiliary additives usually used in the field of elastomeric compositions.

Thus, all or some of the following other constituents and additives may be used: vulcanization agents (for example sulfur or a sulfur-donating compound (such as a thiuram derivative)), vulcanization accelerators (for example a guanidine derivative or a thiazole derivative), vulcanization activators (for example stearic acid, zinc stearate and zinc oxide, which may optionally be introduced in a fractional manner during the preparation of the composition), carbon black, protecting agents (in particular antioxidants and/or antiozonants, for instance N-phenyl-1-N'-(1,3-dimethylbutyl)-p-phenylenediamine), antireversion agents (for instance hexamethylene-1,6-bis(thiosulfate) or 1,3-bis(citraconimidomethyl)benzene); and plasticizers.

The elastomer composition obtained according to the use in accordance with the invention contains an effective amount of the conjugated diene compound of formula (I).

More particularly, the elastomer compositions resulting from the invention may comprise (parts by weight), per 100 parts of elastomer(s):

10 to 200 parts, in particular 20 to 150 parts, especially 30 to 110 parts, for example 30 to 75 parts, of precipitated silica containing titanium;

1 to 20 parts, in particular 2 to 20 parts, especially 2 to 12 parts, for example 2 to 10 parts, of the conjugated diene compound of formula (I).

Preferably, the amount of the conjugated diene compound of formula (I) used, chosen especially within the abovementioned ranges, is determined such that it generally represents 1% to 20%, in particular 2% to 15%, for example 4% to 12% by weight, relative to the amount used of precipitated silica containing titanium.

The elastomer compositions prepared according to the invention, and which are also one of the subjects of the invention, may be prepared according to any standard procedure, especially in two phases. A first phase (the "non-productive" phase) is a phase of high-temperature thermomechanical working. It is followed by a second phase of mechanical working (the "productive" phase) at temperatures generally below 110° C., in which the vulcanization system is introduced.

The elastomer compositions according to the invention may be used for footwear soles, floor coverings, gas barriers, flame-retardant materials, rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires (in particular tire treads), and advantageously (especially when the elastomer compositions contain at least one isoprene elastomer) in tires for heavy-goods vehicles, such as lorries.

The present invention also relates to articles, finished (transformed) or semi-finished (semi-transformed) products, especially fashioned or molded elastomeric articles, comprising at least one elastomer composition according to the invention (especially when it contains at least one isoprene elastomer, for example natural rubber), and especially the abovementioned articles.

The present invention also relates to the use as defined previously, in which the elastomer composition is intended for tires (for example tire treads), especially tires for heavy-goods vehicles (such as lorries), especially when this composition contains at least one isoprene elastomer, for example natural rubber.

The examples that follow illustrate the invention without, however, limiting the scope thereof.

EXAMPLES

Example 1

66 g of $H_3PO_2$ (50% in water), 49 g of mesityl oxide and 100 ml of toluene are placed in a 500 ml flask. The mixture is refluxed for 24 hours under nitrogen. $^{31}$P NMR shows that 82.6% of the H$_3$PO$_2$ has reacted and that 4-methyl-2,4-pentadiene-2-phosphinic acid (PiDM) is obtained with a selectivity of 68.5%, accompanied by other minor impurities, after 6 hours of azeotropic distillation of the water. The reaction is continued for 24 hours to obtain a 97.3% conversion of the H$_3$PO$_2$ and a selectivity of 44.4% for 4-methyl-2,4-pentadiene-2-phosphinic acid (PiDM). The reaction mixture is cooled to room temperature and the residual solvent is removed on a rotary evaporator. The residue is dissolved in 200 ml of dichloromethane and the solution is washed three times with 100 ml of water. The combined dichloromethane phase is dried with anhydrous Na$_2$SO$_4$ and the solvent is evaporated off to obtain 46.5 g of a viscous yellow oil in a crude yield of 63.7% and a 71% purity of PiDM.

Example 2

107.8 g of mesityl oxide, 132 g of H$_3$PO$_2$ (50%) and 400 ml of toluene are placed in a 1 L three-necked round-bottomed flask protected under nitrogen. The system is rinsed with nitrogen and brought to reflux. Water is distilled off in the form of an azeotropic mixture with toluene. The reaction is continued for 20 hours until $^{31}$P NMR shows that all the H$_3$PO$_2$ has been consumed. The reaction mixture is cooled to room temperature and washed with 400 ml of water, and then extracted with dilute NaOH solution. The aqueous phase is then acidified with 4 N HCl at pH 1, and then re-extracted with 50 ml of dichloromethane. The organic phase is collected, dried over anhydrous Na$_2$SO$_4$ and evaporated to give 68.5 g of a bright yellow oil. $^{31}$P NMR shows that 89.7 mol % corresponds to PiDM in a crude yield of 46.9%.

Example 3

A polymer is obtained by polymerization of purified PiDM of Example 2 at room temperature. The polymer is isolated by precipitation from toluene. 40 g of PiDM are dissolved in 100 ml of toluene. 0.1 g of AIBN (azobisisobutyronitrile) is added in three portions under a nitrogen atmosphere at 80° C. over 3 hours. After stirring for a further 1 hour at the same temperature, the precipitate is then filtered off and dried to obtain 30 g of a pale yellow solid polymer. The polymer may be hardened in 10% NaOH solution for 2 days, and then converted into a gel swollen with water.

Example 4

10 g of phosphorous acid, dried for 4 hours at 50° C. under vacuum, and 14.2 g of mixed isomers of mesityl oxide are mixed together in a flask at 28° C. The mixture turns black and $^{31}$P NMR shows that 90% of the phosphorous acid has reacted. 24.7 g of acetic anhydride are then added slowly with stirring over 45 minutes, the temperature being maintained at about 28° C. The mixture is maintained at 48° C. for 4 hours. 98% conversion of the H$_3$PO$_3$ is observed with an 86% selectivity for PoDM and anhydride derivatives thereof.

Example 5

H$_3$PO$_3$ is dried for about 4 hours at 50° C. under vacuum. 10 g of dry H$_3$PO$_3$ and 12.43 g of mesityl oxide are mixed together in a flask at 28-30° C. 24.7 g of acetic anhydride are then added slowly with mixing over 50 minutes, the reaction temperature being kept below 30° C. The mixture is kept stirring at this temperature for 4 hours. $^{31}$P NMR shows 81.2% conversion of the H$_3$PO$_3$ and an 86% selectivity for PoDM and anhydride derivatives thereof.

Example 6

10 g of the PoDM monomer of Example 5 are placed in a 100 ml one-necked round-bottomed flask. The monomer is brought to 100° C. and matured for 5 hours. Once the maturation step is complete, the flask is cooled to room temperature. Analysis by $^1$H NMR reveals that 87% of the PoDM has been converted into an oligomeric form.

Example 7

A filter cake of Z1165MP silica, obtained from a filtration step and having a solids content of 24% by weight, is used. This cake is subjected to a liquefaction operation with water to form a silica slurry having a solids content of 10% by weight.

10 kg of this slurry are placed in a reactor, which is then heated at 60° C. for 40 minutes.

143 g of a sodium hydroxide solution (having a concentration of 1 mol NaOH/kg) is then added at a flow rate of 25 g/minute, allowing a pH of 8 to be reached.

Still at 60° C., 1074 g of a titanium oxysulfate solution (having a concentration of 0.7 mol Ti/kg and prepared from a 15% titanium oxysulfate solution (sold by the company Simon Aldrich)) are then added over 45 minutes, at a pH of 8 regulated by addition of NaOH solution.

The silica slurry thus obtained is then filtered and washed with four times 5 liters of water on a flat filter.

The cake obtained from this filtration is subjected to a liquefaction operation with water to form a silica slurry having a solids content of 10% by weight.

The liquefied cake is then dried using a nozzle atomizer by spraying the liquefied cake through a nozzle with an air pressure of 1 bar (mean inlet temperature: 350° C.; mean outlet temperature: 100° C.).

The characteristics of the precipitated silica obtained are then as follows:

| | |
|---|---|
| CTAB surface area (m$^2$/g) | 157 |
| BET surface area (m$^2$/g) | 196 |
| Titanium (Ti) content (%) | 3.7 |

No crystalline TiO$_2$ is observed by XRD.

Example 8

A filter cake of Z1165MP silica, obtained from a filtration step and having a solids content of 24% by weight, is used. This cake is subjected to a liquefaction operation with water to form a silica slurry having a solids content of 10% by weight.

10 kg of this slurry are placed in a reactor, which is then heated at 60° C. for 40 minutes.

143 g of a sodium hydroxide solution (having a concentration of 1 mol NaOH/kg) is then added at a flow rate of 25 g/minute, allowing a pH of 8 to be reached.

Still at 60° C., 358 g of a titanium oxysulfate solution (having a concentration of 0.7 mol Ti/kg and prepared from a 15% titanium oxysulfate solution (sold by the company Simon Aldrich)) are then added over 15 minutes, at a pH of 8 regulated by addition of NaOH solution.

The silica slurry thus obtained is then filtered and washed with four times 5 liters of water on a flat filter.

The cake obtained from this filtration is subjected to a liquefaction operation with water to form a silica slurry having a solids content of 10% by weight.

The liquefied cake is then dried using a nozzle atomizer by spraying the liquefied cake through a nozzle with an air pressure of 1 bar (mean inlet temperature: 350° C.; mean outlet temperature: 100° C.).

The characteristics of the precipitated silica obtained are then as follows:

| | |
|---|---|
| CTAB surface area (m²/g) | 155 |
| BET surface area (m²/g) | 196 |
| Titanium (Ti) content (%) | 1.1 |

No crystalline $TiO_2$ is observed by XRD.

The compounds as prepared in the preceding Examples 1 to 6 may be used as coupling agent between a precipitated silica containing titanium as prepared in the preceding Examples 7 and 8, and an elastomer, such as a natural rubber, for example.

Example 9

The elastomeric compositions, the make up of which, expressed as parts by weight per 100 parts of elastomers (phr), is shown in Table I below, are prepared in an internal mixer of Brabender type (70 ml):

TABLE I

| Compositions | Control | Composition 1 | Composition 2 |
|---|---|---|---|
| NR (1) | 100 | 100 | 100 |
| Silica 1 (2) | 50 | | |
| Silica S1 (3) | | 50 | |
| Silica S2 (4) | | | 50 |
| Coupling agent (5) | 4.0 | 4.0 | 4.0 |
| ZnO | 2 | 2 | 2 |
| Stearic acid | 2.5 | 2.5 | 2.5 |
| Antioxidant 1 (6) | 1.5 | 1.5 | 1.5 |
| Antioxidant 2 (7) | 1.0 | 1.0 | 1.0 |
| Carbon black (N330) | 3.0 | 3.0 | 3.0 |
| CBS (8) | 1.5 | 1.5 | 1.5 |
| PVI (9) | 0.2 | 0.2 | 0.2 |
| Sulfur | 2.0 | 2.5 | 2.5 |

(1) Natural rubber SMR 5 - CV60 (supplied by the company Safic-Alcan)
(2) Silica Z1165MP from the company Rhodia
(3) Silica S1 according to the present invention (1.1% Ti - Example 7 above)
(4) Silica S2 according to the present invention (3.7% Ti - Example 8 above)
(5) 4-Methyl-2,4-pentadiene-2-phosphinic acid (PiDM)
(6) N-(1,3-Dimethylbutyl)-N-phenyl-para-phenylenediamine (Santoflex 6-PPD from the company Flexsys)
(7) 2,2,4-Trimethyl-1H-quinoline (Permanax TQ from the company Flexsys)
(8) N-Cyclohexyl-2-benzothiazolylsulfenamide (Rhenogran CBS-80 from the company RheinChemie)
(9) N-(Cyclohexylthio)phthalimide (Santograd PVI from the company Flexsys)

Process for Preparing the Rubber Compositions:

The process for preparing the rubber compositions is performed in two successive preparation phases. A first phase consists of a phase of high-temperature thermomechanical working. It is followed by a second phase of mechanical working at temperatures below 110° C. This phase allows the introduction of the vulcanization system.

The first phase is carried out using a mixing device, of internal mixer type, of Brabender brand (capacity of 70 ml). The filling coefficient is 0.75. The initial temperature and speed of the rotors are set on each occasion so as to achieve mixture dropping temperatures of approximately 150-170° C.

Broken down here into two passes, the first phase makes it possible to incorporate, in a first pass, the elastomers and then the reinforcing filler (portionwise introduction) with the coupling agent and the stearic acid. For this pass, the duration is between 4 and 10 minutes.

After cooling the mixture (temperature of less than 100° C.), a second pass makes it possible to incorporate the zinc oxide and the protecting agents/antioxidants (in particular 6-PPD). The duration of this pass is between 2 and 5 minutes.

After cooling the mixture (temperature of less than 100° C.), the second phase allows the introduction of the vulcanization system (sulfur and accelerators, such as CBS). It is performed on an open mill, preheated to 50° C. The duration of this phase is between 2 and 6 minutes.

Each final mixture is subsequently calendered in the form of plates with a thickness of 2-3 mm.

With regard to these "raw" mixtures, an evaluation of their rheological properties makes it possible to optimize the vulcanization time and the vulcanization temperature.

The mechanical and dynamic properties of the mixtures vulcanized at the curing optimum (T98) are then measured.

Rheological Properties

Rheometry of the Compositions:

The measurements are performed on the compositions in crude form. The results relating to the rheology test, which is performed at 150° C. using a Monsanto ODR rheometer according to standard NF ISO 3417, are given in table ii.

According to this test, the test composition is placed in the test chamber regulated at the temperature of 150° C. for 30 minutes, and the resistive torque opposed by the composition to a low-amplitude (3°) oscillation of a biconical rotor included in the test chamber is measured, the composition completely filling the chamber under consideration.

The following are determined from the curve of variation in the torque as a function of time:
the minimum torque (Tmin), which reflects the viscosity of the composition at the temperature under consideration;
the maximum torque (Tmax);
the time T98 necessary to obtain a vulcanization state corresponding to 98% of complete vulcanization (this time is taken as the vulcanization optimum).

The results obtained are shown in table ii.

TABLE II

| Compositions | Control | Composition 1 | Composition 2 |
|---|---|---|---|
| Tmin (dN · m) | 10.4 | 10.7 | 10.9 |
| Tmax (dN · m) | 45.6 | 62.3 | 69.2 |
| T98 (min) | 22.3 | 19.8 | 17.9 |

It is found that the compositions resulting from the invention (Compositions 1 and 2) have a satisfactory combination of rheological properties.

The use of silicas S1 and S2 in the present invention (Compositions 1 and 2) makes it possible to achieve a higher maximum torque value without penalizing the vulcanization behavior and with a shorter optimum time (T98) relative to the control mixture.

Mechanical Properties of the Vulcanizates:

The measurements are performed on the optimally vulcanized compositions (T98) for a temperature of 150° C.

Uniaxial tensile tests are carried out in accordance with the instructions of standard NF ISO 37 with test specimens of H2 type at a rate of 500 mm/min on an Instron 5564 device. The x % moduli, corresponding to the stress measured at x % of tensile strain, and the ultimate strength are expressed in MPa; the elongation at break is expressed in %. It is possible to determine a reinforcing index (R.I.) which is equal to the ratio of the modulus at 300% strain to the modulus at 100% strain.

The Shore A hardness measurement of the vulcanizates is performed according to the instructions of standard ASTM D 2240. The given value is measured at 15 seconds.

The properties measured are collated in table III.

TABLE III

| Compositions | Control | Composition 1 | Composition 2 |
|---|---|---|---|
| 10% Modulus (MPa) | 0.7 | 0.68 | 0.63 |
| 100% Modulus (MPa) | 1.3 | 1.8 | 1.7 |
| 300% Modulus (MPa) | 4.2 | 6.2 | 6.3 |
| Ultimate strength (MPa) | 16.9 | 22.0 | 26.1 |
| Elongation at break (%) | 608 | 606 | 642 |
| R.I. | 3.10 | 3.53 | 3.69 |
| Shore A hardness - 15 s (pts) | 46 | 51 | 52 |

It is found that the compositions resulting from the invention (Composition 1 and Composition 2) have a good compromise of mechanical properties, relative to what is obtained with the control mixture.

Compositions 1 and 2 thus have relatively low 10% and 100% moduli and a high 300% modulus, hence a greater reinforcing index.

The use of silicas S1 and S2 of the present invention (Compositions 1 and 2) make it possible to improve the level of reinforcement by achieving a 300% modulus, a tensile strength and an elongation at break that are higher relative to those of the control mixture.

It is also found that the increase in the titanium content in the silica (Composition 2 relative to Composition 1) makes it possible to increase the tensile strength and the elongation at break.

Dynamic Properties of the Vulcanizates:

The dynamic properties are measured on a viscosity analyzer (Metravib VA3000) according to standard ASTM D5992.

The values for loss factor (tan δ) and compressive dynamic complex modulus (E*) are recorded on vulcanized samples (cylindrical test specimen with a cross section of 95 mm² and a height of 14 mm). The sample is subjected at the start to a 10% prestrain and then to a sinusoidal strain in alternating compression of plus or minus 4%. The measurements are performed at 60° C. and at a frequency of 10 Hz.

The results, presented in table IV, are the compressive complex modulus (E*, 60° C., 10 Hz) and the loss factor (tan δ, 60° C., 10 Hz).

TABLE IV

| Compositions | Control | Composition 1 | Composition 2 |
|---|---|---|---|
| E*, 60° C., 10 Hz (MPa) | 5.28 | 5.08 | 5.66 |
| Tan δ, 60° C., 10 Hz | 0.185 | 0.127 | 0.152 |

The use of silicas S1 and S2 of the present invention (Compositions 1 and 2) allows a consequent reduction in the hysteresis behavior with much lower values of the loss factor (tan δ, 60° C.) relative to the control mixture, while at the same time having satisfactory dynamic rigidity.

Examination of the various tables II to IV shows that the compositions in accordance with the invention (Compositions 1 and 2), i.e. the combined use of a particular silica and of a specific coupling agent, make it possible to increase the mechanical reinforcement and the hysteresis properties at 60° C. relative to the control mixture.

One consequence of the combined use of a precipitated silica containing titanium and of a particular coupling agent as claimed is that it achieves an improvement in the compromise between wear resistance and rolling resistance when the elastomer composition is used for tire applications (for example: for cars, vans, trucks, heavy-goods lorries, etc.) and for various parts of the tire (such as: tread, sub-tread, belt, side wall, bead, carcass, envelope, liner, etc.).

The invention claimed is:

1. An elastomer composition comprising:
   at least one elastomer,
   a precipitated silica containing titanium, as mineral filler, wherein the titanium content of said precipitated silica is not more than 10% by weight, and
   a compound of formula (I), said compound of formula (I) being optionally, totally or partly, in a polymerized form:

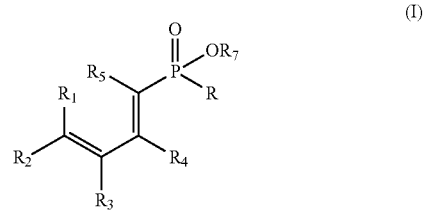

wherein:
   R represents $R_6$ or $OR_8$,
   $R_1$, $R_2$, $R_3$, $R_4$, $R_5$ and $R_6$ are each independently selected from hydrogen, alkyl, aryl, alkaryl, aralkyl, cycloalkyl, heterocycloalkyl and alkenyl groups, and
   $R_7$ and $R_8$ are each independently selected from hydrogen, alkyl, aryl, alkaryl, aralkyl, cycloalkyl and alkenyl groups, and metals selected from the group consisting of Na, Li and Ca.

2. The elastomer composition as claimed in claim 1, wherein the compound of formula (I), which is optionally, totally or partly, in a polymerized form, couples said precipitated silica and said elastomer(s).

3. The elastomer composition as claimed in claim 2, wherein said elastomer composition does not comprise any other mineral filler/elastomer coupling agent.

4. The elastomer composition as claimed in claim 1, wherein all or part of the compound of formula (I) is in the form of a polymer with a polymerization index of less than 20.

5. The elastomer composition as claimed in claim 1, wherein R represents $R_6$.

6. The elastomer composition as claimed in claim 1, wherein R represents $OR_8$.

7. The elastomer composition as claimed in claim 1, wherein $R_1$, $R_2$ and $R_4$ each represent H.

8. The elastomer composition as claimed in claim 1, wherein $R_3$ and $R_5$ each represent a methyl group.

9. The elastomer composition as claimed in claim 1, wherein the compound of formula (I) is 4-methyl-2,4-pentadiene-2-phosphinic acid.

10. The elastomer composition as claimed in claim 1, wherein the titanium content of said precipitated silica is at least 0.5% by weight.

11. The elastomer composition as claimed in claim 1, wherein the titanium content of said precipitated silica is between 0.5% and 10% by weight.

12. The elastomer composition as claimed in claim 1, wherein the amount of compound of formula (I) in the composition is from 1% to 20% by weight relative to the amount of said precipitated silica.

13. The elastomer composition as claimed in claim 1, wherein said compound of formula (I) and said precipitated silica are premixed with each other.

14. The elastomer composition as claimed in claim 1, wherein the elastomer comprises at least one isoprene elastomer.

15. The elastomer composition as claimed in claim 14, wherein said elastomer composition does not comprise any elastomer(s) other than said isoprene elastomer(s).

16. The elastomer composition as claimed in claim 1, wherein the elastomer comprises at least one isoprene elastomer and at least one diene elastomer other than an isoprene elastomer, and wherein the amount of isoprene elastomer(s) relative to the total amount of elastomer(s) is greater than 50% by weight.

17. An article comprising at least one elastomer composition as claimed in claim 1, wherein the article is selected from a footwear sole, a floor covering, a gas barrier, a flame-retardant material, a roller for a cableway, a seal for a domestic electrical appliance, a seal for a liquid or gas pipe, a braking system seal, a pipe, a sheathing, a cable, an engine support, a battery separator, a conveyor belt, a transmission belt or a tire.

18. A tire for heavy-goods vehicles, the tire comprising at least one elastomer composition as claimed in claim 1.

19. The elastomer composition as claimed in claim 13, wherein said compound of formula (I) is pregrafted onto said precipitated silica.

20. A method for reinforcing an elastomer composition, the method comprising contacting the elastomer with:
    a precipitated silica containing titanium, as mineral filler, wherein the titanium content of said precipitated silica is not more than 10% by weight, and
    a compound of formula (I), said compound of formula (I) being optionally, totally or partly, in a polymerized form:

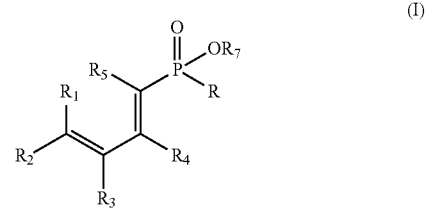

wherein:
R represents $R_6$ or $OR_8$,
$R_1$, $R_2$, $R_3$, $R_4$, $R_5$ and $R_6$ are each independently selected from hydrogen, alkyl, aryl, alkaryl, aralkyl, cycloalkyl, heterocycloalkyl and alkenyl groups, and
$R_7$ and $R_8$ are each independently selected from hydrogen, alkyl, aryl, alkaryl, aralkyl, cycloalkyl and alkenyl groups, and metals selected from the group consisting of Na, Li and Ca.

* * * * *